July 7, 1959  H. W. MULCAHY  2,893,571
RUBBER DRAFT GEARS
Filed Aug. 27, 1956  2 Sheets-Sheet 1

Inventor
Harry W. Mulcahy
By
Edward T. Jurow Atty.

Inventor
Harry W. Mulcahy
By
Edward F. Jurow Atty.

United States Patent Office 2,893,571
Patented July 7, 1959

2,893,571
RUBBER DRAFT GEARS

Harry W. Mulcahy, Chicago, Ill., assignor to W. H. Miner, Inc., Chicago, Ill., a corporation of Delaware Application August 27, 1956, Serial No. 606,241

6 Claims. (Cl. 213—45)

This invention relates to rubber draft gears and particularly to a draft gear employing rubber cushioning elements, certain ones of which dissipate impact energy through friction.

It is a primary object of this invention to employ a plurality of rubber cushioning elements, some of which absorb impact energy internally and others of which, in addition, transmit such energy to friction shoes and convert same into heat as the result of friction between such shoes and a confining member.

A more specific object of the invention is to provide an outer enclosing member in the form of a casing having a closed end and receiving a plunger within the other open end thereof; said plunger acting upon a plurality of resilient pads, certain ones of which have friction shoes bonded to the edges thereof and are frictionally engageable with the inner surfaces of the casing.

Other objects of the invention not specifically mentioned here will be apparent from the detailed description and claims which follow, reference being made to the accompanying drawings in which a preferred embodiment of the invention is shown by way of example and in which:

Figure 1:
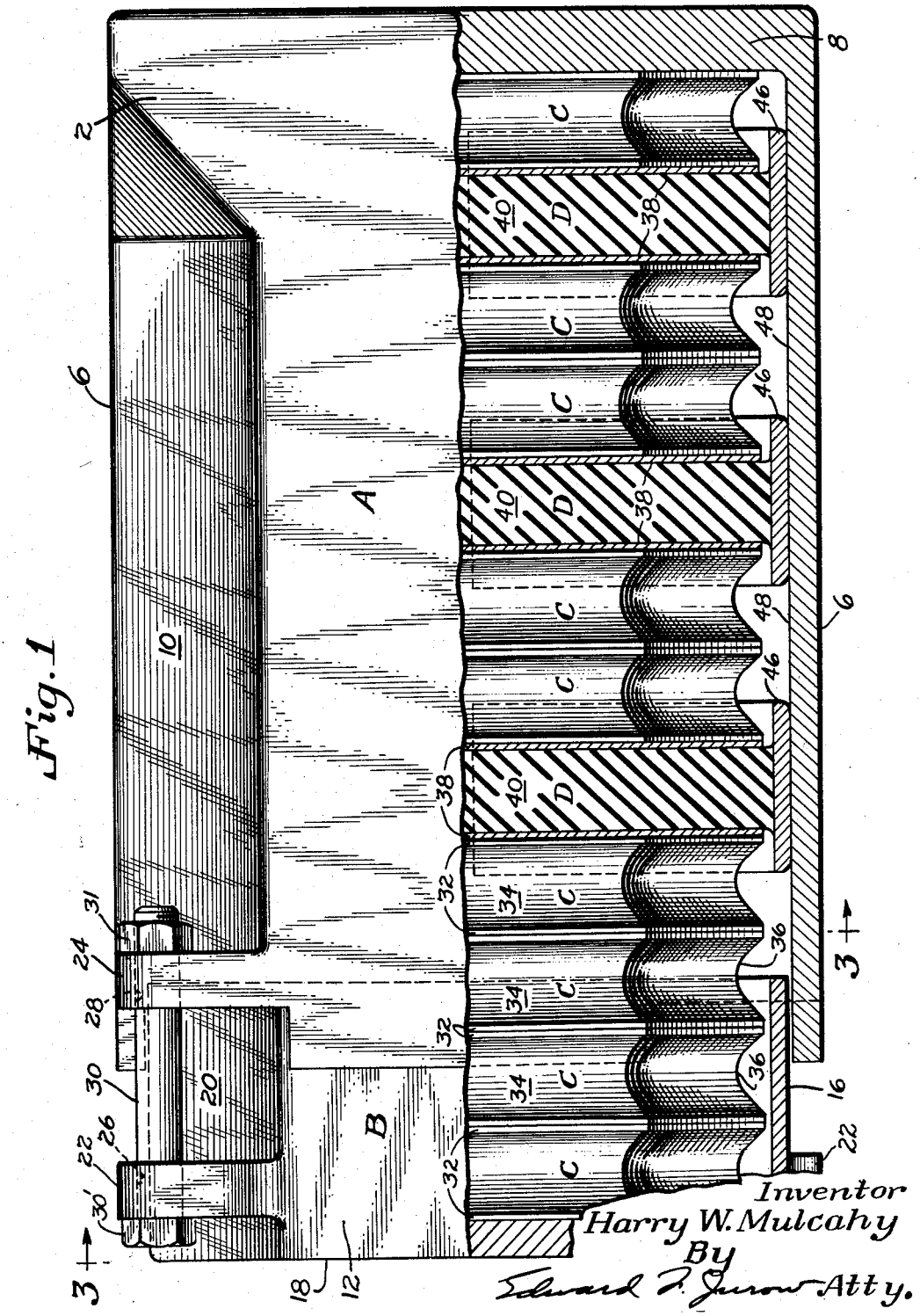
Figure 1 is a plan view of a draft gear according to the invention in its relaxed condition, partially in cross section and showing the cushioning elements in full except those cushioning elements bonded to friction shoes, the latter being shown in cross section.
Figure 2:
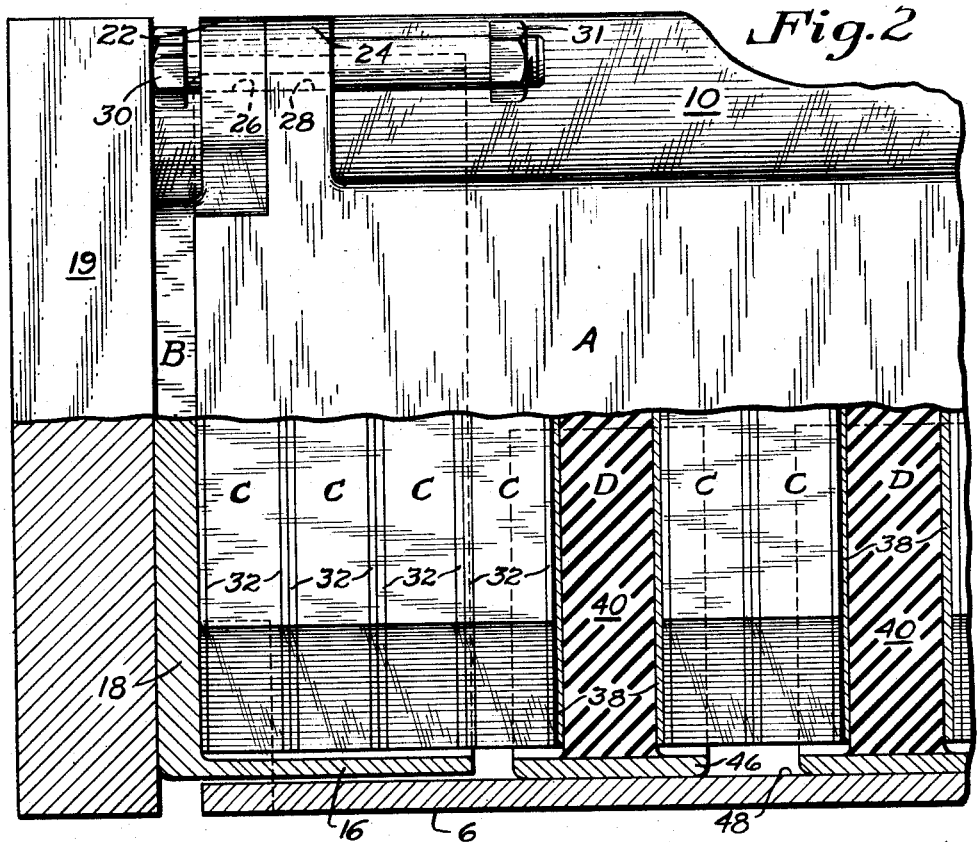
Figure 2 is similar to Figure 1 and shows the gear fully compressed.

The gear of the present invention, as illustrated in the drawings, consists of a shell A, force transmitting means B, cushioning units C, and resilient friction units D.

The shell or casing A comprises integral top, bottom, side and rear walls 2, 4, 6, and 8. The top and bottom walls 2 and 4 are joined to the side walls 6 by diagonal corner sections 10 to thus provide a casing of high rigidity.

Similarly, the force transmitting means B in the form of a plunger comprises top, bottom and side walls 12, 14 and 16, all integral with a front wall 18, and diagonal corner sections 20 joining the top and bottom walls 12 and 14 with the side walls 16. A follower 19 is normally in engagement with the front wall 18.

Extending from the diagonal corner sections 20 are ears 22 which are somewhat longer than corresponding ears 24 on the casing so that a hole 26 in the ear 22 on the plunger will be in alignment with the hole 28 in the ear 24 to permit the passage therethrough of an assembly bolt 30 having a nut 31 threaded on the end thereof. The ears 22 are offset to accommodate the bolt heads 30'.

Disposed within the casing and partially within the plunger are the cushioning units C which comprise metal plates 32 bonded to an intervening rubber pad 34 which in its non-operative relaxed position of the gear is undercut or grooved throughout its periphery, as at 36.

Figure 3:
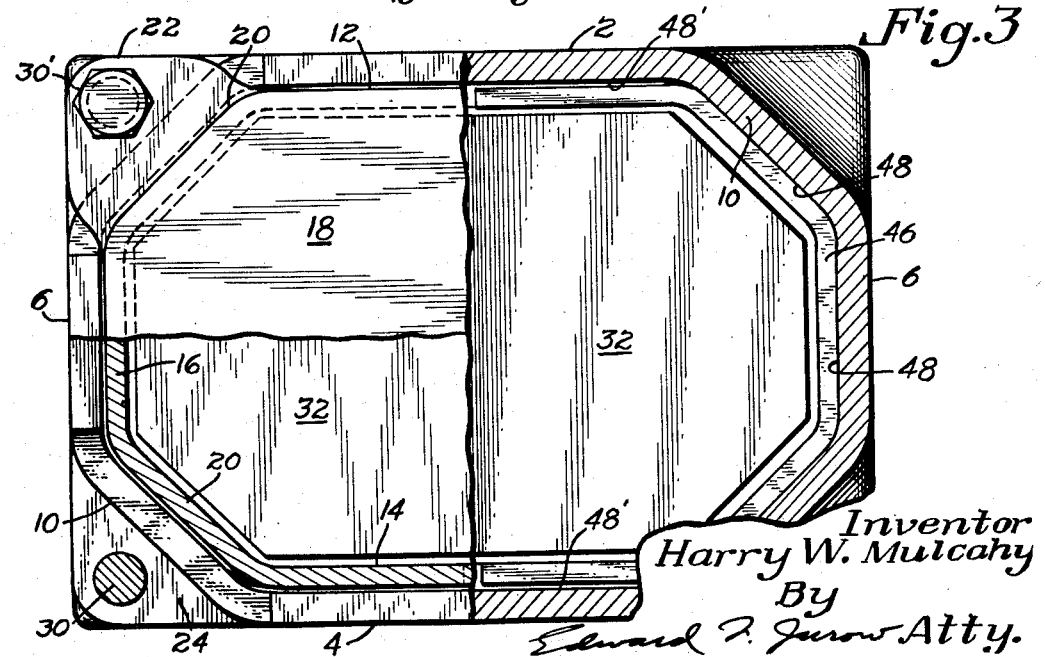
Figure 3 is a front end composite view of the gear substantially along the line 3—3 of Figure 1; the upper left quarter being a true end elevation, the lower left quarter being a section through the plunger, and the right half being a section showing a friction shoe resilient unit in full.

The resilient friction units D are somewhat similar to the cushioning units C in that they comprise metal plates 38 bonded to an intervening rubber pad 40, but instead of being undercut at their lateral edges extend beyond the edges of the metal plates 38 and are each bonded to a pair of friction shoes 46. The friction shoes 46 are in contact with the inner longitudinal surfaces 48 of the casing A, as shown in Figure 3, and under near capacity load will also contact casing surfaces 48'. The friction shoes 46 are formed of a metal strip and substantially follow the lateral contour of the inner shell surface. Each shoe 46 of the pair of shoes bonded to a pad 40 extends through slightly less than fifty percent of the periphery of a rubber pad 40. Small fillets are provided in the rubber pad 40 adjacent to the bond with the friction shoes 46 to eliminate a sharp line of demarcation.

It is to be understood that the gear is symmetrical on either side of a vertical longitudinal central plane through the gear.

To assemble the gear, a cushioning unit C is placed within the shell A into contact with the inner surface of the rear wall 8. A resilient friction unit D is then inserted through the open end of the casing and forced downwardly into contact with the previously inserted cushioning unit C. Two groups comprising a pair of cushioning units C and a friction unit D are then placed in succession within the shell A followed by four cushioning units C which top off the assembly of rubber units. At this time the plunger is fitted within the casing, the entire assemblage being then subjected to compressive force, followed by placing the bolts 30 through the aligned openings in the ears 22 and 24 and secured in position by affixing the nuts 31 to the ends thereof.

In operation, when the assembled gear is subjected to impact or compressive forces as encountered during train movements, the plunger slidingly telescopes within the housing and thereby compresses the cushioning unit C and the friction units D. The cushioning units C having the undercuts 36 will exhibit a flow of rubber to occupy the space thus provided. The other units D will exert a lateral force upon the friction shoes and urge same into tight frictional contact with the inner surfaces of the casing A. Upon release of the compressive load, the rubber in the respective units will return to normal and permit the tight frictional engagement to disappear, thus insuring positive release of the gear.

It will be readily apparent that the shoes 46 and rubber pads 40 can be so predetermined as to obtain uniform entire frictional engagement of each shoe with the adjacent inner surface of the casing. Likewise, it is possible, to attain progressive frictional engagement whereby a portion of each shoe will be in initial frictional engagement with the casing inner surface and upon the application of further load the remainder of each shoe will frictionally engage the casing walls.

While the preferred embodiment of the invention has been described and illustrated, it has been done so by way of example only as there are many modifications and adaptations, such as varying the density of the rubber to modify the spring rate, provide a taper on the inside surface of the casing, employ two plungers, one at either end of the housing, and other modifications, which can be made by one skilled in the art within the teachings of this invention.

Having thus complied with the statutes and shown and described the invention, what I consider new and desire to have protected by Letters Patent is pointed out in the appended claims.

What I claim is:

1. In a shock absorbing mechanism having a friction shell and a plunger telescopically movable within one end thereof, the combination therewith of a plurality of rubber cushioning units within the shell and capable of absorbing compressive forces applied through said plunger, a plurality of friction shoes bonded to certain intervening ones of said units and in frictional engagement with the inner longitudinal surface of said shell, each of said friction shoes consisting of a strip of metal formed to follow the lateral contour of the inner shell surface and bonded to the edge surface of a rubber unit.

2. Shock absorbing mechanism according to claim 1 in which the friction shoes bonded to a rubber unit are two in number and each encompasses slightly less than 50 percent of the periphery of said unit.

3. In a shock absorbing mechanism, the combination with a friction shell having a closed rear end, of a plunger telescopically movable in the other end of the shell, a stack of metal-faced rubber compression units within the shell, groups of said units having undercut peripheries, intervening metal-faced rubber units having flush peripheries to which a plurality of friction shoes are bonded and are in frictional engagement with the longitudinal inner surfaces of the shell, said compression units and friction units substantially completely filling said shell.

4. In a shock absorbing mechanism, the combination with a closed rear end friction shell, of a plunger movable within the other end of such shell, retaining means on the shell and plunger, groups of metal-faced peripherally undercut rubber compressive units nested within said shell, single metal-faced rubber units having friction shoes bonded to the periphery thereof interposed between said groups of units and having the friction shoes in contact with the inner longitudinal surfaces of the shell.

5. In a shock absorbing mechanism, the combination with a friction shell having a closed rear end, of a hollow plunger at the other end of the shell and telescopically movable against a stack of cushioning units within the shell and plunger, such units having undercut peripheries, a plurality of friction units interposed between the cushioning units, and a pair of shoes bonded to the periphery of each of said friction units and in frictional engagement with the walls of the shell.

6. In a shock absorbing mechanism, the combination with a friction shell having a closed rear end, of a hollow plunger at the other end of the shell and telescopically movable against a stack of metal-faced cushioning units within the shell and plunger, such units having undercut peripheries, a plurality of metal-faced friction units interposed between the cushioning units, and a plurality of shoes bonded to the periphery of each of said friction units and in frictional engagement with the walls of the shell.

References Cited in the file of this patent

UNITED STATES PATENTS

| | | |
|---|---|---|
| 1,988,427 | Barrows | Jan. 15, 1935 |
| 2,212,759 | Tea | Aug. 27, 1940 |
| 2,260,532 | Lindeman | Oct. 28, 1941 |
| 2,555,431 | Withall | June 5, 1951 |
| 2,650,721 | Bourdon | Sept. 1, 1953 |
| 2,705,634 | Sampson et al. | Apr. 5, 1955 |
| 2,713,483 | Tillou | July 19, 1955 |
| 2,765,929 | Mulcahy | Oct. 9, 1956 |

FOREIGN PATENTS

| | | |
|---|---|---|
| 640,431 | Germany | Jan. 4, 1937 |